(12) United States Patent
Frank et al.

(10) Patent No.: US 10,281,334 B2
(45) Date of Patent: May 7, 2019

(54) TEMPERATURE MEASUREMENT APPLIANCE AND METHOD FOR THE OPERATION THEREOF

(71) Applicant: Robert Bosch GmbH, Stuttgart (DE)

(72) Inventors: Michael Frank, Bretten (DE); Rene Schrottenholzer, Gaeufelden (DE); Mike Uhlig, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 407 days.

(21) Appl. No.: 15/085,103

(22) Filed: Mar. 30, 2016

(65) Prior Publication Data

US 2016/0290869 A1 Oct. 6, 2016

(30) Foreign Application Priority Data

Apr. 2, 2015 (DE) .................. 10 2015 206 038

(51) Int. Cl.
*G01J 5/04* (2006.01)
*G01K 1/08* (2006.01)
*G01J 5/02* (2006.01)
*G01J 5/08* (2006.01)

(52) U.S. Cl.
CPC ............... *G01J 5/048* (2013.01); *G01J 5/026* (2013.01); *G01J 5/0265* (2013.01); *G01J 5/0846* (2013.01); *G01K 1/08* (2013.01)

(58) Field of Classification Search
CPC .................................................... G01J 5/048
See application file for complete search history.

(56) References Cited

U.S. PATENT DOCUMENTS

| 6,195,581 | B1 * | 2/2001 | Beerwerth et al. | 600/474 |
| 8,271,197 | B2 * | 9/2012 | Fogarty et al. | 702/2 |
| 2014/0260604 | A1 * | 9/2014 | Ranwell | 73/335.01 |

FOREIGN PATENT DOCUMENTS

| DE | 20 2005 015 397 U1 | 3/2007 |
| DE | 10 2012 215 690 A1 | 3/2014 |

* cited by examiner

*Primary Examiner* — Clayton E. LaBalle
*Assistant Examiner* — Leon W Rhodes, Jr.
(74) *Attorney, Agent, or Firm* — Maginot, Moore & Beck LLP

(57) ABSTRACT

A temperature measurement appliance for contactless temperature measurement, in particular a handheld temperature measurement appliance, includes a housing and at least one sensor that is disposed on the housing. The at least one sensor is configured to measure one or more of a relative air humidity and an ambient temperature. The temperature measurement appliance further includes at least one protective cap that is configured to be reversibly arranged on the temperature measurement appliance so as to mechanically protect the at least one sensor. The temperature measurement appliance further includes one or more features arranged on the temperature measurement appliance that are configured to detect an arranged state of the at least one protective cap. A method for operating the temperature measurement appliance includes detecting the arranged state of the protective cap on the temperature measurement appliance.

12 Claims, 7 Drawing Sheets

TEMPERATURE MEASUREMENT APPLIANCE AND METHOD FOR THE OPERATION THEREOF

This application claims priority under 35 U.S.C. § 119 to patent application no. DE 10 2015 206 038.1, filed on Apr. 2, 2015 in Germany, the disclosure of which is incorporated herein by reference in its entirety.

BACKGROUND

The disclosure relates to a temperature measurement appliance for contactless temperature measurement, having a sensor which is provided on the housing of the temperature measurement appliance and which serves for measuring a relative air humidity and/or an ambient temperature, and having a protective cap which can be reversibly arranged on the temperature measurement appliance for the purposes of mechanically protecting the sensor.

Contactless temperature measurement appliances such as radiation thermometers or pyrometers detect the thermal radiation (infrared radiation) emitted by an object, whose intensity, and position of maximum emission, are dependent on the temperature of the object. By evaluating these variables, it is possible to infer the temperature of the emitting object, in particular the surface temperature thereof.

Pyrometers have already been proposed which, by way of an infrared lens (IR lens) and a thermopile as a detector, can measure infrared radiation emitted by an object and, from this, determine the surface temperature thereof. DE 20 2005 015 397 U1 has disclosed a handheld radiation thermometer of said type.

A basic disadvantage of such temperature measurement appliances consists in that the measurement sensor arrangement, and thus also the measurement values output by the temperature measurement appliance, are sensitively dependent on the ambient temperature around the temperature measurement appliance. DE 10 2012 215 690 A1 has disclosed a temperature measurement appliance which, in addition to the detection device for contactless IR temperature measurement, additionally has an ambient temperature sensor for determining an ambient temperature around the temperature measurement appliance, the knowledge of which is used to reduce the sensitivity of the temperature measurement appliance, in particular to reduce measurement inaccuracies.

SUMMARY

The disclosure is based on a temperature measurement appliance for contactless temperature measurement, in particular a handheld temperature measurement appliance, preferably an infrared temperature measurement appliance, having at least one sensor which is provided on the housing of the temperature measurement appliance and which serves for measuring a relative air humidity and/or an ambient temperature, and having at least one protective cap which can be reversibly arranged on the temperature measurement appliance for the purposes of mechanically protecting the at least one sensor. According to the disclosure, means are provided at least on the temperature measurement appliance, which means make it possible for an arranged state of the at least one protective cap to be detected.

Here, temperature measurement appliances for contactless temperature measurement, or contactless temperature measurement appliances, should be understood to mean any temperature measurement appliances suitable for contactlessly measuring a temperature, in particular a surface temperature, of an object. In particular, infrared temperature measurement appliances, for example spot thermometers and thermal imaging cameras, represent preferred embodiments of such temperature measurement appliances. Other configurations of contactless temperature measurement appliances are however also conceivable. In principle, the fundamentals and technical teachings essential to the disclosure of the exemplary embodiments highlighted below for the purposes of illustrating the advantages of the disclosure may also be transferred to other measurement appliances, in particular handheld measurement appliances.

Infrared temperature measurement appliances, in particular spot thermometers and thermal imaging cameras, have the advantage over conventional temperature measurement appliances of contactless and rapid measurement, and can thus be used in particular when regions to be measured are accessible only with difficulty or are not accessible at all. The temperature measurement by way of an infrared-sensitive temperature measurement appliance is in this case based on the detection of thermal radiation, that is to say infrared radiation, in particular in a wavelength range between 3 µm and 50 µm, which is emitted by any object with different intensity depending on its temperature, in particular its surface temperature. From a measured intensity of the emitted thermal radiation by way of the temperature measurement appliance, it is possible to determine a surface temperature of the emitting body. Spot thermometers have a typically conical, preferably small measurement volume from which thermal radiation is detected and output as an averaged temperature value to a user. By contrast, thermal imaging cameras typically have an infrared-sensitive image sensor and make it possible, similarly to a camera that operates in the visible spectral range, for an object for examination to be measured in the infrared range of the radiation spectrum and for a two-dimensional, color-coded image of the object to be output on the screen.

An exemplary embodiment of a contactless temperature measurement appliance, in particular of a handheld temperature measurement appliance, has at least one detector device for detecting thermal radiation radiated from a region to be measured, and for generating detection signals on the basis of detected thermal radiation, an evaluation device for receiving and evaluating detection signals of the detector device, a control device for controlling the temperature measurement appliance, a device for supplying energy to the temperature measurement appliance, and a sensor which is provided on the housing of the temperature measurement appliance and which serves for measuring a relative air humidity and/or an ambient temperature. In particular, it is pointed out that the detector device for detecting thermal radiation—which detector device may likewise have a sensor or sensor elements—is not identical to the sensor for measuring the air humidity and/or the ambient temperature. In this context, the sensor for measuring the air humidity and/or the ambient temperature constitutes an additional sensor which enhances the functionality of the temperature measurement appliance, in particular of the infrared temperature measurement appliance.

Here, a handheld temperature measurement appliance is to be understood in particular to mean that the temperature measurement appliance can be transported, and also controlled during a measurement process, by hands alone, in particular by one hand, without the aid of a transportation machine. For this purpose, the mass of the temperature measurement appliance is in particular less than 5 kg, advantageously less than 3 kg and particularly advantageously less than 1 kg. The temperature measurement appliance may advantageously have a grip or a grip region by which the temperature measurement appliance can be controlled during a measurement process.

It is proposed that the components of the temperature measurement appliance, in particular at least one control device, an evaluation device, a device for supplying energy to the temperature measurement appliance, an input and/or output device and a detector device are at least partially accommodated in the housing of the temperature measurement appliance. In particular, more than 50%, preferably more than 70% and particularly preferably 100% of the total volume of the components is accommodated in the housing of the temperature measurement appliance. It is thus advantageously possible to realize a compact temperature measurement appliance which is easy to control using one hand. Furthermore, in this way, the components can advantageously be protected against damage and environmental influences, for example moisture and dust. The housing which accommodates the main components of the temperature measurement appliance, that is to say in particular at least the control device, the evaluation device, the device for supplying energy, the input and/or output device and the detector device, will hereinafter also be referred to, for unique designation, as "main housing" or as "housing of the temperature measurement appliance".

A sensor for measuring a relative air humidity and/or an ambient temperature is provided on the housing of the temperature measurement appliance, in particular outside the housing of the temperature measurement appliance. With knowledge of the relative air humidity and/or of the ambient temperature around the temperature measurement appliance, the risk of inaccurate measurements or incorrect measurements, for example owing to a temperature measurement appliance that has not acclimatized to the surroundings, can be reduced or advantageously eliminated entirely. In particular, provision may for example be made for the user of the temperature measurement appliance to be notified of the risk of an inaccurate measurement. Alternatively or in addition, at least one measurement value of the sensor, in particular a temperature measurement value and/or air humidity measurement value, may be used for correction and/or calibration purposes in the temperature measurement appliance. It is advantageously possible, for example, using calibration measurement values determined by the sensor, for evaluation results to be interpreted and/or converted and/or interpolated and/or extrapolated and for the temperature measurement appliance to be calibrated in particular with regard to an ambient temperature.

The sensor is preferably provided in a sensor housing which is arranged separately outside the housing, in particular outside the main housing of the temperature measurement appliance which contains the main components of the temperature measurement appliance, which sensor housing in particular extends longitudinally away from the housing of the temperature measurement appliance, but which sensor housing is connected to said housing. In one embodiment, the sensor housing is an integral constituent part, that is to say in particular is a constituent part integrated by non-positively locking and/or positively locking and/or cohesive means, of the main housing of the temperature measurement appliance (for delimitation from the main housing, the unique designation "sensor housing" will hereinafter be used regardless of the embodiment). The direction of extent and length extent of the sensor housing are in this case preferably adapted to the contour of the housing of the temperature measurement appliance such that the sensor housing cannot be damaged, owing to an exposed arrangement, in the event of shock loading on the temperature measurement appliance, for example as a result of the temperature measurement appliance being dropped. The sensor housing is advantageously surrounded, on at least two sides, by the main housing of the temperature measurement appliance. In this way, the sensor can advantageously be arranged spaced apart from the main housing of the temperature measurement appliance in the sensor housing provided separately outside the main housing of the temperature measurement appliance, but nevertheless advantageously in a particularly well-protected manner.

The sensor is advantageously, owing to the arrangement thereof spaced apart from the housing of the temperature measurement appliance, thermally decoupled from the temperature measurement appliance, such that the sensor advantageously measures an ambient temperature and/or relative air humidity which are/is independent of influences originating from the temperature measurement appliance itself and/or from the operator thereof. Furthermore, further means may be provided which make it possible for the effect of the thermal decoupling of the sensor from the housing of the temperature measurement appliance and/or from an operator of the temperature measurement appliance to be further enhanced, in particular for example by way of thermal insulating elements or the like. For example, for the thermal decoupling, it is possible for the sensor housing to be connected to the main housing of the temperature measurement appliance by way of small webs. The webs for fastening the sensor housing to the housing of the temperature measurement appliance may be connected integrally to the sensor housing. Alternatively, the webs for fastening the sensor housing to the housing of the temperature measurement appliance may be connected integrally to the housing of the temperature measurement appliance. Provision may furthermore advantageously be made for the sensor housing of the sensor to be formed from a material with good thermal conductivity, in particular a metal.

It is advantageously possible for the sensor housing of the sensor to be of substantially open form or at least formed with slots or holes or the like in order to permit the best possible thermal contact of the ambient air with the sensor.

In one embodiment of the temperature measurement appliance according to the disclosure, further sensors may be provided, in particular further sensors for determining the temperature and/or air humidity in and/or outside the temperature measurement appliance. For example, by way of a further temperature sensor, it is possible for the temperature of the infrared sensor of the detector device to be determined, and, by way of the determination of a temperature difference between the sensor in the sensor housing and the sensor at the infrared sensor, it is possible to derive information regarding the state of acclimatization of the temperature measurement appliance.

An ambient temperature is to be understood in particular to mean the temperature surrounding the temperature measurement appliance, that is to say for example the temperature in the immediate vicinity of the temperature measurement appliance. If the temperature measurement appliance is for example used in a closed room, the ambient temperature preferably corresponds to the room temperature. By contrast, if the temperature measurement appliance is used in an open area, the ambient temperature would be the outside temperature in the region of the temperature measurement appliance.

In an equivalent manner, the air humidity is to be understood to mean a relative moisture content of the air surrounding the temperature measurement appliance, in particular the sensor.

A protective cap that can be reversibly arranged on the temperature measurement appliance serves for the mechanical protection of the at least one sensor. The protective cap preferably encases the sensor housing and terminates at the main housing of the temperature measurement appliance, such that advantageously complete encasement of the sensor housing and thus of the sensor is realized. In particular, the protective cap serves for protection against ingress of particles, objects, dust, moisture and other environmental influences, and furthermore also against mechanical shocks, vibrations and other actions of force on the sensor housing of the sensor and on the sensor. The protective cap, in the arranged state, preferably conforms to a standard with regard to classification of its protective action, in particular to at least IP44, preferably at least IP55, particularly preferably at least IP56, as defined by DIN EN 60529. The protective cap can be arranged reversibly on the temperature measurement appliance, in particular can be reversibly separated (removed) from and mounted onto the temperature measurement appliance.

The protective cap can advantageously be removed by an operator of the temperature measurement appliance before a measurement is performed, such that the sensor housing surrounding the sensor is exposed and the sensor is, by way of the slots provided in the sensor housing, in direct communication with the surroundings, in particular without protection from the protective cap.

According to the disclosure, at least on the temperature measurement appliance, there are provided means which make it possible for an arranged state of the at least one protective cap to be detected. "Provided" is to be understood in particular to mean specially programmed, configured and/or equipped. The statement that an object is provided for a particular function is to be understood in particular to mean that the object carries out and/or performs said particular function in at least one state of use and/or operation, or is designed to carry out the function. The arranged state of the at least one protective cap is to be understood in particular to mean the state in which the at least one protective cap is, for protection of the at least one sensor, arranged on the temperature measurement appliance so as to encase the sensor housing. Said arranged state differs in particular from the state, in particular "removed state", in which the protective cap does not encase the sensor housing, such that the sensor, or at least the sensor housing, is in direct communication with the surroundings in an unprotected manner. The means for detecting an arranged state may in particular comprise mechanical and/or electronic means. Such means according to the disclosure for the detection of an arranged state of the at least one protective cap may for example constitute sensors, electrical circuits and/or mechanically or electromechanically actuable means. In particular, however, means for the detection of an arranged state do not refer to mere color codings such as for example a coloring of the protective cap in signal color.

The protective cap advantageously makes it possible for the sensor, which is protected in the arranged state, to be protected against external influences, in particular dirt, moisture and/or mechanical actions such as vibrations, shocks and the like. However, if the protective cap is not removed from or taken off the sensor during a measurement, the accuracy of the measurement may be adversely affected. It is particularly advantageously possible for the means provided for detecting the arranged state of the protective cap to be utilized for reducing, in particular eliminating, the risk of influenced measurements and/or incorrect measurements of the sensor. For this purpose, the detection of the arranged state of the at least one protective cap may be interpreted as an indication that a determination of the ambient temperature of the temperature measurement appliance and/or of the air humidity of the air surrounding the temperature measurement appliance has not been, and/or cannot be, carried out correctly by way of the sensor. In this way, it is particularly advantageously possible to provide a functionality of the temperature measurement appliance which makes it possible for the measurement accuracy of the measurements to be performed by way of the temperature measurement appliance to be improved and/or interpreted, that is to say in particular for information regarding the quality of the measurement to be derived.

In one advantageous embodiment of the temperature measurement appliance according to the disclosure, the means for detecting an arranged state of the at least one protective cap have a sensor-counterpart pair, in particular a sensor-activator or a sensor-actuator pair, and/or an electrical switch and/or a mechanical switch.

A sensor-counterpart pair is to be understood in particular to mean a two-part system comprising a sensor and a suitable counterpart element, such that the sensor detects the presence of the counterpart element if the sensor registers a physical characteristic of the counterpart element. In particular, this also includes sensor-activator pairs. Examples of such sensor-counterpart pairs are in particular sensors sensitive to magnetic fields in combination with magnets, capacitive sensors in combination with dielectrics, temperature-sensitive sensors in combination with elements that emit thermal radiation, or light-sensitive sensors in combination with light-emitting elements. In particular, it is pointed out that the sensor of the sensor-counterpart pair is not identical to the sensor for measuring the air humidity and/or the ambient temperature. In this context, the sensor of the sensor-counterpart pair constitutes an additional sensor which additionally enhances the functionality of the temperature measurement appliance, in particular of the infrared temperature measurement appliance. Using a sensor-counterpart pair of said type, it is possible—for example with a sensor of the sensor-counterpart pair integrated into the housing of the temperature measurement appliance and a counterpart element integrated into the protective cap—to realize reliable detection of the arranged state of the protective cap.

Alternatively and/or in addition, it is possible for an arranged state of the at least one protective cap to be detected by way of an electrical switch and/or a mechanical switch, for example if, during the arrangement of the protective cap for the protection of the sensor, the electrical switch and/or the mechanical switch is actuated as a result of the arrangement of the protective cap. It is preferably possible for an electrical and/or mechanical switch of said type to be realized in functional combination with a holding, hook, clamping or detent device for the reversible holding and removal of the protective cap on and from the housing of the temperature measurement appliance, such that, when the protective cap is arranged, the holding, hook, clamping or detent element holds the protective cap in its position, while at the same time the electrical and/or mechanical switch detects the presence of the protective cap, in particular the arranged state thereof.

The detection of an arranged state of the at least one protective cap by way of a sensor-counterpart pair and/or an electrical and/or mechanical switch advantageously permits reliable identification of the arranged state of the protective cap. In particular, the realization by way of an electrical and/or mechanical switch constitutes an economically particularly expedient realization of a means according to the disclosure for detecting the arranged state of the protective cap.

In one embodiment of the temperature measurement appliance, the energy required for the operation of an electrical circuit, in particular of the sensor of the sensor-counterpart pair, may be drawn directly from the energy supply device of the temperature measurement appliance.

In one advantageous embodiment of the temperature measurement appliance according to the disclosure, the means for detecting an arranged state of the at least one protective cap have a sensor, which is sensitive to distance, of the sensor-counterpart pair.

Using a sensor, which is sensitive to distance, of the sensor-counterpart pair for the detection of an arranged state of the at least one protective cap, it is advantageously possible for said protective cap to be identified as being arranged even when the protective cap is not arranged correctly, that is to say in particular is not arranged in its holding position or detent position, which it is to assume in the arranged state, on the temperature measurement appliance. This may be the case for example if the protective cap is not correctly mounted over the sensor housing, with the result that the protective cap is not fastened to a holding, hook, clamping or detent device provided for the reversible arrangement of the protective cap. When a sensor, which is sensitive to distance, of the sensor-counterpart pair is used, it is advantageously possible for the incorrect state of arrangement of the protective cap to likewise be output to a user of the temperature measurement appliance using an output device, for example by way of acoustic warning sounds, and thus for the user to be warned of a possible loss of the protective cap.

In an advantageous embodiment of the temperature measurement appliance according to the disclosure, the means for detecting an arranged state of the at least one protective cap have a sensor which is sensitive to magnetic fields, in particular a Hall sensor.

A Hall sensor is a sensor which is sensitive to magnetic fields and which constitutes a preferred embodiment of a sensor, which is sensitive to distance, of the sensor-counterpart pair. In combination with a magnet, it is possible in this way to realize a sensor-counterpart pair which permits particularly reliable detection of the arranged state of the at least one protective cap. For this purpose, it is for example possible for the Hall sensor to be integrated into the housing of the temperature measurement appliance, whereas the magnet, as counterpart element, is a constituent part of the protective cap.

The magnet, as a constituent part of the protective cap, may furthermore be used in particular for the stable arrangement of the protective cap on the temperature measurement appliance. In this way, it is possible to dispense with mechanical components for realizing a holding or detent device. Furthermore, using a Hall sensor-magnet pair, it is advantageously possible to dispense with mechanical components for the detection of the arranged state of the at least one protective cap. The omission of (electro-)mechanical components, in particular holding, hook, clamping or detent elements or switches or the like, also has an advantageous effect on the permanent realization of the functional characteristics both of the protective cap and of the sensor for measuring the ambient temperature and/or air humidity together with sensor housing, especially as functional restrictions or even loss of function owing to fouling or wear of the mechanical elements—typically associated with loss of contact and/or interlocking and jamming of the elements—are avoided.

In an advantageous embodiment of the temperature measurement appliance according to the disclosure, the means for detecting an arranged state of the at least one protective cap have a capacitive sensor or a sensor which is sensitive to ultrasound, in particular a sensor which is sensitive to distance.

Using capacitive sensors or sensors which are sensitive to ultrasound, in particular capacitive sensor-counterpart pairs or sensor-counterpart pairs which are sensitive to ultrasound, it is possible to realize alternative cost-effective embodiments of the temperature measurement appliance according to the disclosure, in which an arranged state of the at least one protective cap is reliably detected.

In an advantageous embodiment of the temperature measurement appliance according to the disclosure, the means for detecting an arranged state of the at least one protective cap have a switch which is operated when the protective cap is in an arranged or removed state.

A switch of said type, in particular a mechanical and/or electrical switch, constitutes an advantageously simple realization of the means for detecting an arranged state of the at least one protective cap. It is preferably possible for an in particular electrical and/or mechanical switch of said type to be formed together with means provided for the stable arrangement of the protective cap, in particular holding, hook, clamping or detent elements. An electrical switch particularly preferably detects the arranged state of the protective cap by way of a short circuit or closure of an electrical circuit as a result of the arrangement of the protective cap. It is thus possible to realize a reliable embodiment, which is easy to realize in terms of production and is therefore economically particularly expedient, of the means for detecting the arranged state of the protective cap.

In an advantageous embodiment of the temperature measurement appliance according to the disclosure, the means for detecting an arranged state of the at least one protective cap output an electrical signal to a control device of the temperature measurement appliance.

It is preferably possible in this way for the signal relating to the detection of an arranged state of the protective cap to be processed further by way of the control device of the temperature measurement appliance. Numerous embodiments are conceivable in which the signal generated by the means for detecting the arranged state is evaluated, transmitted and/or output to a user of the temperature measurement appliance. In particular, a notification that the protective cap is in an arranged state on the sensor and/or on the temperature measurement appliance can be output to a user of the temperature measurement appliance using the output device of the temperature measurement appliance, in particular by acoustic, optical, tactile or other means. It is advantageously possible in this way for a warning to be output to the user of the temperature measurement appliance, which warning notifies said user of possible incorrect measurements or inaccurate measurements of the sensor for measuring an ambient temperature and/or air humidity, and thus also of the temperature measurement appliance, if said user leaves the protective cap in the arranged state during the measurement.

Furthermore, it may for example be provided that operation of the temperature measurement appliance is blocked when the protective cap is situated in the arranged state.

It is furthermore possible for the electrical signal to be utilized as a basis for the implementation of at least one function of the temperature measurement appliance. A multiplicity of such functions which are implemented in a manner dependent on the detection of the arranged state of the protective cap is conceivable. For example, functional restrictions of the temperature measurement appliance, such as in particular non-activation of background illumination of an output display, may be realized in the case of an arranged state of the protective cap being detected. Alternatively or in addition, functional enhancements may also be provided, for example recourse to calibration data stored within the appliance for the purposes of calibrating the temperature measurement appliance, rather than using the measurement values determined by the sensor for measuring the ambient temperature and/or air humidity.

According to the disclosure, a method for operating a temperature measurement appliance is also proposed, in which an arranged state of a protective cap which can be reversibly arranged on the temperature measurement appliance for the purposes of mechanically protecting an air humidity and/or ambient temperature sensor is detected.

It is advantageously possible for the method in which an arranged state of a protective cap is detected to be utilized for reducing, in particular eliminating, the risk of influenced measurements and/or incorrect measurements of the sensor for measuring the ambient temperature and/or air humidity, and thus also the risk of influenced and/or incorrect measurements of the temperature measurement appliance, in the case of a protective cap not being removed during a temperature measurement. For this purpose, it is possible in particular for the detection of the arranged state of the at least one protective cap to be interpreted as an indication that a determination of the ambient temperature of the temperature measurement appliance and/or of the air humidity of the air surrounding the temperature measurement appliance has not been, and/or cannot be, carried out correctly.

In an advantageous embodiment of the method for operating a temperature measurement appliance, the detection of an arranged state, in particular of a removed state, of the protective cap controls a function of the temperature measurement appliance.

It is thus possible for at least one function of the temperature measurement appliance to be implemented in a manner dependent on the detection of an arranged state, alternatively or additionally also of a removed state, of the protective cap.

BRIEF DESCRIPTION OF THE DRAWINGS

The disclosure will be discussed in more detail in the following description on the basis of exemplary embodiments illustrated in the drawings. The drawing, the description and the claims contain numerous features in combination. A person skilled in the art will expediently also consider the features individually and combine them to form further meaningful combinations. In the figures, identical elements are denoted by the same reference signs.

In the figures.

DETAILED DESCRIPTION

The following presentation of the exemplary embodiments relates substantially to a contactless temperature measurement appliance according to the disclosure, such as may be realized for example as an infrared temperature measurement appliance. In principle, the fundamentals and technical teachings essential to the disclosure of the exemplary embodiments highlighted below for the purposes of illustrating the advantages of the disclosure may self-evidently also be transferred to other measurement appliances with at least one sensor provided on the housing thereof and with at least one protective cap that can be reversibly arranged on the measurement appliance for the purposes of mechanically protecting said sensor, for example in particular to other optical measurement appliances such as cameras, spectroscopic measurement appliances, telescopes, binoculars and the like, but also to measurement appliances such as laser range finders, humidity measurement appliances, radar measurement appliances or other measurement appliances that appear expedient to a person skilled in the art. Depending on the task and usage location of the measurement appliance, the at least one sensor and the protective cap for the protection of the at least one sensor may be designed differently, in particular with regard to the position in relation to the appliance.

Figure 1:
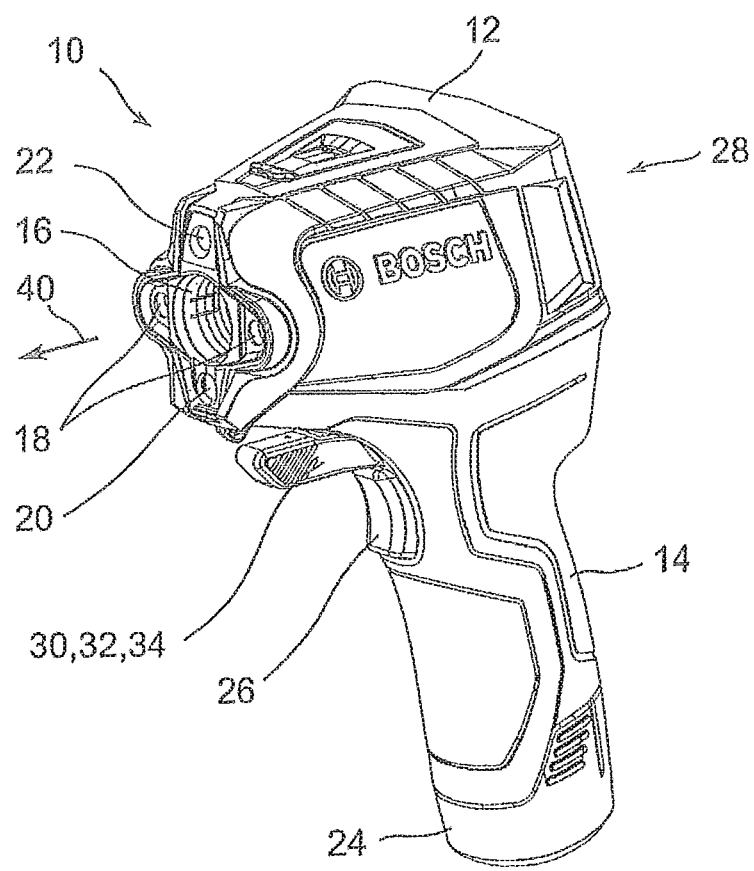
FIG. 1 shows an embodiment of a temperature measurement appliance according to the disclosure in a perspective frontal view.

FIG. 1 shows, in a perspective illustration, an embodiment of an exemplary infrared temperature measurement appliance 10 according to the disclosure. The temperature measurement appliance 10 comprises a housing 12 with a grip 14. By way of the grip 14, it is possible for a user to comfortably hold the temperature measurement appliance 10 using one hand during the use of said temperature measurement appliance. The housing 12 of the temperature measurement appliance 10 furthermore has, on a side facing toward a user during the use of the temperature measurement appliance 10, an output device in the form of a touch display, and operating elements for user input and control of the temperature measurement appliance 10 (neither of which are illustrated in any more detail). On that side of the housing 12 which is averted from the user, an inlet opening 16 is provided in the housing 12, through which inlet opening thermal radiation radiated by an object can enter the temperature measurement appliance 10. Further components of the temperature measurement appliance 10 in its embodiment illustrated in FIG. 1 include laser diodes 18, which mark a measurement point, a camera 20 which operates in the visible spectrum, and an illumination unit 22.

On the underside of the temperature measurement appliance 10, the grip 14 has a receptacle for accommodating an energy store 24, which can be formed by way of example as a rechargeable accumulator, in particular a lithium-ion accumulator, or as a battery.

In a manner which is not illustrated in any more detail here, in the interior of the temperature measurement appliance 10, electrical components of the temperature measurement appliance 10 are mounted, and interconnected, on a printed circuit board. The electrical components comprise at least one control device, an evaluation device and a detector device with a detector for detecting the thermal radiation that enters the temperature measurement appliance 10. The control device constitutes, in particular, a device which comprises at least one set of control electronics and means for communication with the other components of the temperature measurement appliance 10, in particular means for controlling and regulating the temperature measurement appliance 10. The control device is provided for controlling, and enabling the operation of, the temperature measurement appliance 10. For this purpose, the control device is connected in terms of signal transmission to the other components of the temperature measurement appliance 10, in particular to the detector device, to the evaluation device, to the operating elements, to the touch display and to a data communication interface. The evaluation device serves for receiving and evaluating detection signals of the detector device.

A trigger 26 which is easy for an operator of the temperature measurement appliance 10 to reach and operate serves for triggering a temperature measurement.

On the housing 12 of the temperature measurement appliance 10 there is provided a sensor 30 for measuring a relative air humidity and/or an ambient temperature of the temperature measurement appliance 10. Here, the sensor 30 is preferably provided in a sensor housing 34 which is arranged separately outside the housing 12, which sensor housing extends longitudinally away from the housing 12 of the temperature measurement appliance 10 but is connected to said housing 12. The direction and length of extent of the sensor housing 34 are in this case preferably adapted to the contour of the housing of the temperature measurement appliance 10 such that the sensor housing 34 of the sensor 30 cannot be damaged, owing to an exposed arrangement, in the event of shock loading on the temperature measurement appliance 10, for example as a result of the temperature measurement appliance 10 being dropped. In particular, the sensor housing 34 together with sensor 30 contained therein may, in an advantageous embodiment, be provided above the hand grip 14 of the temperature measurement appliance 10, preferably above the operable trigger 26. It is particularly preferably the case that a measurement head 28, which projects beyond the hand grip 14 in a measurement direction 40 arranged approximately orthogonally to the hand grip 14 and which contains inter alia those components of the temperature measurement appliance 10 that are relevant to the execution of the measurement, projects beyond the sensor housing 34 in the length extent thereof away from the housing 12, with said sensor housing 34 thus being protected by the hand grip 14 and measurement head 28. In this way, the sensor housing 34 of the sensor 30 can be arranged separately outside the housing 12 of the temperature measurement appliance 10 and can nevertheless be arranged in a particularly well-protected manner.

In the embodiment of the temperature measurement appliance 10 according to the disclosure illustrated in FIG. 1, the protective cap 32 (cf. in particular FIGS. 4, 6) is situated in an arranged state on the temperature measurement appliance 10, wherein the sensor 30 is protected against environmental influences, in particular moisture, dust and mechanical actions such as vibration and shocks, by the protective cap 32.

Figure 2:
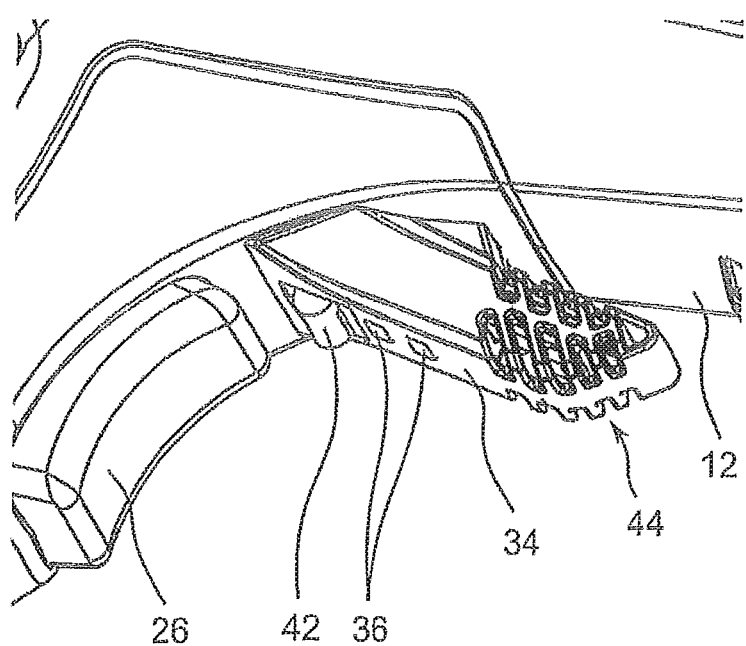
FIG. 2 is a perspective illustration of an embodiment of the sensor housing without an arranged protective cap.
Figure 3:
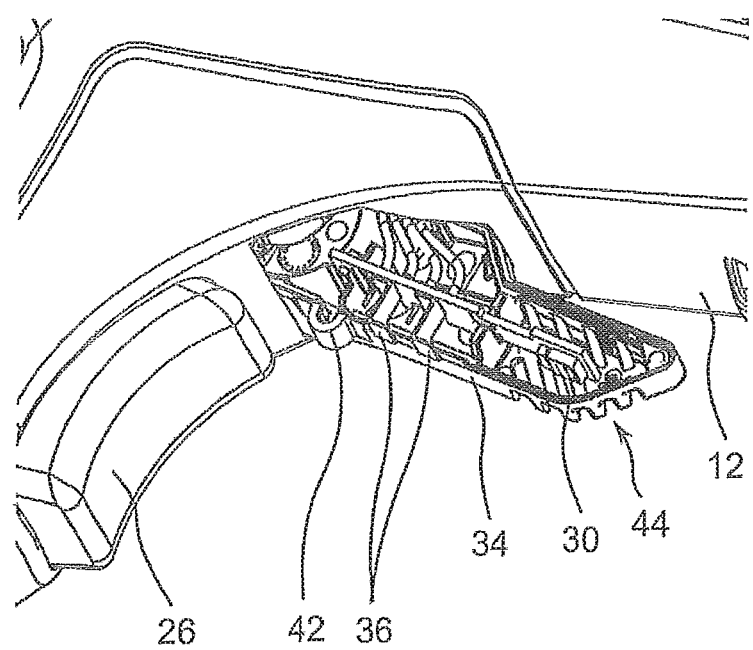
FIG. 3 is a perspective schematic sectional illustration of an embodiment of the sensor housing without an arranged protective cap.

FIG. 2 illustrates a detail of the temperature measurement appliance 10, said figure illustrating the sensor housing 34 on an enlarged scale and without an arranged protective cap 32. The sensor 30 is situated in the small sensor housing 34, which is formed in one piece with the housing 12 of the temperature measurement appliance 10, wherein the sensor housing 34 is substantially thermally decoupled from the rest of the housing 12 of the temperature measurement appliance 10. As illustrated in FIG. 3, the sensor 30 is preferably situated in the head of the sensor housing 34 such that the spacing of said sensor to the temperature measurement appliance 10, in particular to the housing 12 of the temperature measurement appliance 10, is particularly large. In the illustrated, unprotected state of the sensor 30, that is to say when the protective cap 32 has been removed, the sensor 30 is in direct communication with the air surrounding it via slots 44 in the sensor housing 34. It is thus possible for air from the surroundings to flow unhindered to the sensor 30. During operation of the sensor 30, the sensor 30, which is sensitive to air humidity and temperature, detects a relative air humidity and an ambient temperature of the air surrounding it. The measurement signals provided by the sensor 30 to the evaluation unit serve for the calibration of the detector device and for the estimation of the accuracy of the temperature measurement values detected by way of the detector device from the measured infrared radiation. The sensor housing 34 has holding means 42 for the stable arrangement of the protective cap 32 (cf. also FIGS. 4, 6).

Two electrical contacts 36 are situated on the sensor housing 34 of the sensor 30 on the underside thereof, which electrical contacts are electrically continued in the interior of the sensor housing 34, in particular are continued to the control device (cf. FIG. 3).

Figure 4:
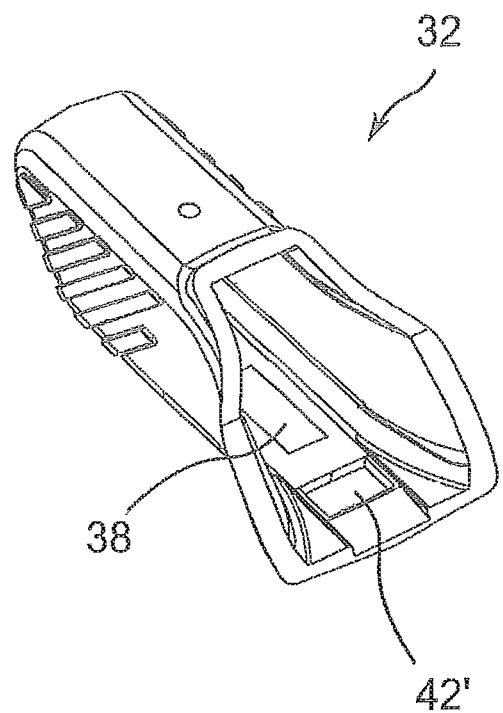
FIG. 4 is a perspective illustration of an embodiment of a protective cap.

FIG. 4 illustrates, in a schematic perspective illustration, an embodiment of the protective cap 32 according to the disclosure for protecting the sensor 30. In the interior of the protective cap 32 there is situated an electrically conductive metal strip 38 which, in an arranged state of the protective cap 32, connects the electrical contacts 36 that are situated on the underside of the sensor housing 34, and thus closes the electrical circuit. As a result of the closure of the electrical circuit in an arranged state of the protective cap 32, an electrical current flows through the electrical contacts 36 and through the electrically conductive metal strip 38. The current flow is, within the appliance, conducted onward to the control device of the temperature measurement appliance 10, and signals to the control device the arranged state of the protective cap 32 on the temperature measurement appliance. The electrical contacts 36 and the electrically conductive metal strip 38 function, in this exemplary embodiment, as electrical switches by means of which an arranged state of the at least one protective cap 32 is detected. In this way, the electrical contacts 36 and the electrically conductive metal strip 38 act as means 36, 38 which make it possible for an arranged state of the at least one protective cap 32 to be detected. Furthermore, the protective cap 32 has holding means 42' which are of complementary form to the holding means 42, such that, in an arranged state of the protective cap 32, the holding means 42 and 42' permit a stable fastening of the protective cap 32.

Figure 5:
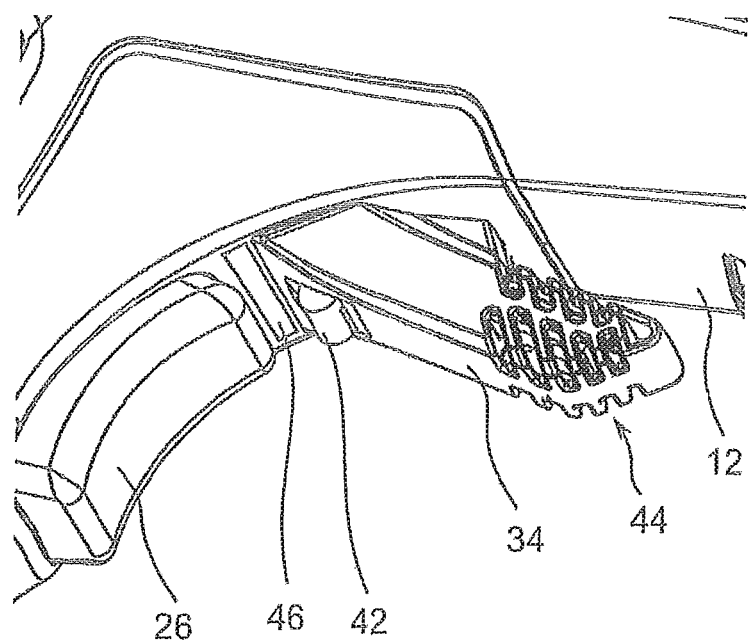
FIG. 5 is a perspective illustration of an alternative embodiment of the sensor housing without an arranged protective cap.

FIG. 5 illustrates a detail of an alternative embodiment of the temperature measurement appliance 10, said figure illustrating the sensor housing 34 on an enlarged scale and without an arranged protective cap 32. Instead of the electrical contacts 36 (cf. FIG. 3) provided on the sensor housing 34 of the sensor 30, it is the case in the embodiment illustrated here that a sensor 46 of a sensor-counterpart pair is illustrated, which sensor may in particular be realized as a Hall sensor or as a capacitive sensor. Said sensor 46 detects an arranged state of the protective cap 32 (cf. FIG. 6) on the temperature measurement appliance if said protective cap has been correctly mounted onto the sensor housing 34 of the sensor 30. In this way, the sensor 46 and the counterpart element 48 of the sensor-counterpart pair act as means 46, 48 which make it possible for an arranged state of the at least one protective cap 32 to be detected.

Figure 6:
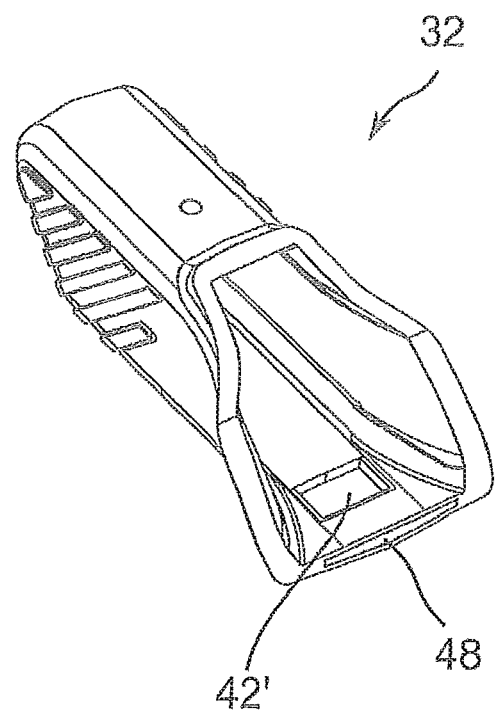
FIG. 6 is a perspective illustration of an alternative embodiment of a protective cap.

As illustrated in FIG. 6, for this purpose, the protective cap 32, in a corresponding embodiment, has not an electrically conductive metal strip 38 (cf. in particular FIG. 4) but a counterpart element 48. Therefore, depending on the selection of the sensor 46 as a Hall sensor or capacitive sensor, said counterpart element 48 is in particular selected to be in the form of a magnet or a material with a dielectric constant that differs from that of air. The action of the protective cap 32 being brought closer and arranged causes the counterpart element 48 to be moved into the detection range of the sensor 46 of the sensor-counterpart pair, such that the sensor 46 outputs to the control device a signal relating to the arrangement of the protective cap 32 on the temperature measurement appliance.

Figure 7:
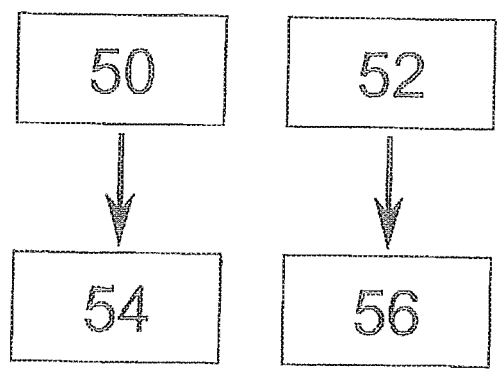
FIG. 7 shows a method diagram of an embodiment of the method according to the disclosure.

FIG. 7 illustrates a method diagram showing an embodiment of the method according to the disclosure for the operation of the temperature measurement appliance, in which method an arranged state or a removed state of the protective cap is detected, as illustrated by method step 50 or 52 respectively, and accordingly a respective function 54 or 56 of the temperature measurement appliance is implemented in a manner dependent on the detection of the arranged state 50 or the detection of the removed state 52 of the protective cap.

What is claimed is:

1. A temperature measurement appliance for contactless temperature measurement, comprising:
   a housing having a hand grip;
   at least one sensor disposed on the housing, the at least one sensor configured to measure one or more of a relative air humidity and an ambient temperature, the at least one sensor extending from the housing approximately orthogonally to the hand grip;
   at least one protective cap configured to be reversibly arranged on the temperature measurement appliance so as to mechanically protect the at least one sensor; and
   one or more elements disposed at least on the temperature measurement appliance and configured to detect an arranged state of the at least one protective cap.

2. The temperature measurement appliance according to claim 1, wherein the one or more elements configured to detect an arranged state of the at least one protective cap have one or more of a sensor-counterpart pair, an electrical switch, and a mechanical switch.

3. The temperature measurement appliance according to claim 2, wherein the sensor-counterpart pair is a sensor-activator pair or a sensor-actuator pair.

4. The temperature measurement appliance according to claim 1, wherein the one or more elements configured to detect an arranged state of the at least one protective cap have a sensor that is sensitive to distance.

5. The temperature measurement appliance according to claim 1, wherein the one or more elements configured to detect an arranged state of the at least one protective cap have a sensor that is sensitive to magnetic fields.

6. The temperature measurement appliance according to claim 5, wherein the sensor that is sensitive to magnetic fields is a Hall sensor.

7. The temperature measurement appliance according to claim 1, wherein the one or more elements configured to detect an arranged state of the at least one protective cap have a capacitive distance sensor or a distance sensor that is sensitive to ultrasound.

8. The temperature measurement appliance according to claim 1, wherein the one or more elements configured to detect an arranged state of the at least one protective cap have a switch that is operated when the protective cap is in an arranged state or a removed state.

9. The temperature measurement appliance according to claim 1, wherein the one or more elements configured to detect an arranged state of the at least one protective cap output an electrical signal to a control device of the temperature measurement appliance.

10. The temperature measurement appliance according to claim 1, wherein the temperature measurement appliance is configured as a handheld temperature measurement appliance.

11. A method for operating a temperature measurement appliance, comprising:
    detecting an arranged state of a protective cap configured to be reversibly arranged on the temperature measurement appliance,
    wherein the protective cap is configured to mechanically protect at least one sensor disposed on a housing of the temperature measurement appliance so as to extend from the housing approximately orthogonally to a hand grip of the housing, and
    wherein the at least one sensor is configured to measure one or more of an air humidity and an ambient temperature.

12. The method for operating a temperature measurement appliance according to claim 11, wherein the detection of an arranged state of the protective cap controls a function of the temperature measurement appliance.

* * * * *